US009251037B2

(12) United States Patent
Milojicic et al.

(10) Patent No.: US 9,251,037 B2
(45) Date of Patent: Feb. 2, 2016

(54) PROVIDING ELASTIC INSIGHT TO INFORMATION TECHNOLOGY PERFORMANCE DATA

(75) Inventors: Dejan S Milojicic, Palo Alto, CA (US); Vanish Talwar, Campbell, CA (US); Timothy F Forell, Los Altos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1043 days.

(21) Appl. No.: 13/289,930

(22) Filed: Nov. 4, 2011

(65) Prior Publication Data

US 2013/0116975 A1 May 9, 2013

(51) Int. Cl.
*G06F 11/30* (2006.01)
*G06F 11/34* (2006.01)
*H04L 12/26* (2006.01)
*H04L 29/06* (2006.01)

(52) U.S. Cl.
CPC ........ *G06F 11/3495* (2013.01); *G06F 11/3409* (2013.01); *H04L 12/26* (2013.01); *H04L 29/06* (2013.01); *H04L 43/00* (2013.01)

(58) Field of Classification Search
CPC . G06F 11/3409; G06F 3/0685; G06F 3/0647; G06F 3/0631; G06F 12/0848; G06F 12/0875; G06F 17/20156; G06F 3/0641; G06F 3/067; H04L 67/10; H04L 67/32; H04L 12/26; H04L 29/06; H04L 26/02; H04L 43/00
USPC .................................................. 709/224–227
See application file for complete search history.

(56) References Cited

U.S. PATENT DOCUMENTS

| 6,442,583 | B1 * | 8/2002 | Eilert et al. .................... 718/104 |
| 8,543,642 | B2 * | 9/2013 | Corbett et al. ................. 709/203 |
| 8,606,907 | B1 * | 12/2013 | Wogulis et al. ............... 709/224 |
| 2004/0148279 | A1 * | 7/2004 | Peleg .................................. 707/3 |
| 2004/0148383 | A1 * | 7/2004 | Gonsalves et al. ............ 709/224 |
| 2005/0187972 | A1 | 8/2005 | Kruger et al. |
| 2008/0059707 | A1 * | 3/2008 | Makineni et al. ............. 711/122 |

OTHER PUBLICATIONS

"10 Reasons to Choose QuanturnTM" Online: http://alliedsoft.com/products/quantum/whyquantum.aspx; retrieved Aug. 22, 2011.
"Citrix® EdgeSightTM Performance Management Architecture", Document Version: Aug. 2006.
Helfert, et al. "An Approach to Monitoring Data Quality—Product Oriented Approach" Aug. 1, 2010.
Lubinski, et al. "Business Activity Monitoring: Process Control for the Enterprise" Feb. 12, 2008.

* cited by examiner

*Primary Examiner* — Chirag R Patel
(74) *Attorney, Agent, or Firm* — Hewlett Packard Enterprise Patent Department

(57) ABSTRACT

Elastic insight to Information Technology ("IT") performance data is provided. Local performance data is continuously pushed from a front-end component to a back-end component. Global performance data is continuously pushed from the back-end component to the front-end component. The local performance data and the global performance data are aggregated at the front-end component by product, product family, and product solution. The aggregated data is monitored at the front-end component to identify a performance bottleneck.

20 Claims, 12 Drawing Sheets

PROVIDING ELASTIC INSIGHT TO INFORMATION TECHNOLOGY PERFORMANCE DATA

BACKGROUND

Large scale and cloud datacenters are becoming increasingly popular. Small, medium, and large businesses alike are turning to these datacenters for their data storage and Information Technology ("IT") needs. A given business may have its own IT infrastructure and one or more datacenters integrated across different geographical areas to handle all of its tasks. The datacenters and the IT infrastructure may be typically architected with numerous storage devices and servers that may be shared across multiple users and run multiple IT products both in their front-end and back-end. Each one of these storage devices and servers may be responsible for storing, managing and keeping a history of large amounts of data in many levels of detail. Managing all of the IT devices and products at all times is one of the key challenges faced by businesses today.

A common challenge affecting datacenters and IT infrastructures is the monitoring of their IT devices and products. Typically IT monitoring solutions collect extensive information from the front-end and store it on the back-end. The information collected may be in the form of performance data that is aged over time and possibly reduced to smaller levels of detail. However, past information is not usually available to IT personnel at the front-end at the time of degraded performance or failure. The result is that it takes time to recognize problems and users may become increasingly frustrated with their IT infrastructure. The IT devices and products may not always meet their expected performance and user requirements despite the extensive data maintained in the back-end.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
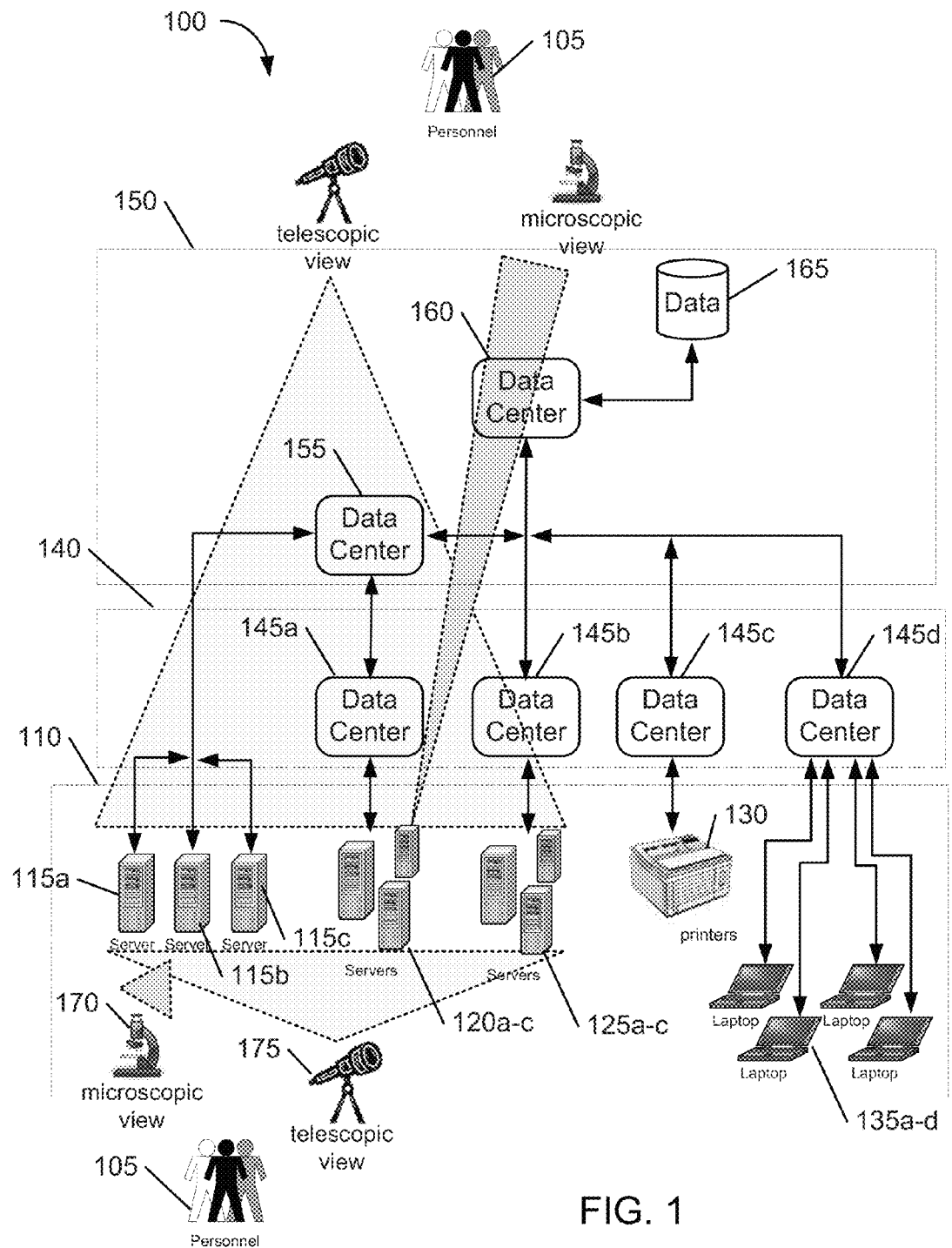
FIG. 1 is a schematic diagram illustrating an example IT infrastructure in which the embodiments may be implemented.

A method, system, and non-transitory computer readable medium for providing elastic insight to Information Technology ("IT") performance data are disclosed. As generally described herein, elastic insight refers to the ability to maintain IT performance data at different scopes, sizes, times, and levels of an IT infrastructure hierarchy (i.e., front-end, back-end, and intermediate levels) to account for different IT products, product families, and product solutions. Performance data may include any data or information that may provide insight to the performance (e.g., latency, bandwidth, QoS, reliability, failure, faults, etc.) of an IT product, product family, or solution. An IT product may be an IT application, device, or a bundle of applications and devices for performing one or more IT tasks. A product family may be a group of products derived from a common product platform. The products in a given product family may use similar production processes, have similar physical characteristics, and may share customer segments, distribution channels, pricing methods, promotional campaigns, and other elements of a marketing mix. These products may also be priced and discounted as a package. Several product families may make up a product solution.

In various embodiments, elastic insight to IT performance data is provided by continuously pushing local performance data from the front-end to the back-end of an IT infrastructure and continuously pushing global performance data from the back-end to the front-end. The local performance data may be data obtained locally at the front-end about a product, product family, and product solution over time. Similarly, the global performance data may be data obtained at the back-end about a product, product family, and product solution over time. The local performance data and the global performance data are aggregated by product, product family, and product solution to provide a detailed view of a product's performance. The aggregated data may be monitored at the front-end to identify a performance bottleneck in a product, product family, and/or product solution. The monitoring may be performed by hierarchically searching the aggregated data across the IT infrastructure to identify a performance bottleneck. A performance bottleneck may be any unexpected and/or undesirable change in performance.

It is appreciated that embodiments described herein below may include various components and features. Some of the components and features may be removed and/or modified without departing from a scope of the method, system, and non-transitory computer readable medium for providing elastic insight to IT performance data. It is also appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Reference in the specification to "an embodiment," "an example" or similar language means that a particular feature, structure, or characteristic described in connection with the embodiment or example is included in at least that one example, but not necessarily in other examples. The various instances of the phrase "in one embodiment" or similar phrases in various places in the specification are not necessarily all referring to the same embodiment. As used herein, a component is a combination of hardware and software executing on that hardware to provide a given functionality.

Referring now to FIG. 1, a schematic diagram illustrating an example IT infrastructure in which the embodiments may be implemented is described. IT infrastructure 100 is composed of multiple IT devices, products, product families, and solutions across one or more geographical areas. The IT devices may include one or more servers, printers, displays, laptops, computers, network devices (e.g., switches, routers, etc.) and so on, operating at multiple levels of IT infrastructure 100. The IT infrastructure 100 may be roughly divided into a front-end, a back-end, and one or more intermediate levels. The IT front-end may be composed of multiple IT devices, products, product families, and solutions capable of interfacing to IT personnel 105 or other users of the IT infrastructure 100. The IT back-end may be composed of multiple IT devices, products, product families, and solutions operating at levels beyond the user-interface level at the front-end and beyond intermediate levels between the front-end and the back-end. As appreciated by one skilled in the art, each level may be composed of multiple IT devices, products, product families, and product solutions. As also appreciated by one skilled in the art, IT products, product families, and product solutions may operate across one or more IT devices at one or more levels of the IT infrastructure 100. An IT device and the IT products, product families, and product solutions running on that device (as well as other software running on that device) may be generally referred to herein as an IT component.

For example, the front-end 110 of IT infrastructure 100 may include servers 115a-c, 120a-c, and 125a-c, printer 130, and laptops 135a-d. The intermediate level 140 of IT infrastructure 100 may include datacenters 145a-e and the back-end 150 may include datacenters 155-160 and data store 165. It is appreciated that the distinction between the intermediate level 140 and the back-end 150 is for illustration purposes only; one skilled in the art can envision datacenter 155 as part of the intermediate level 140. One skilled in the art can also appreciate that additional IT devices not pictured in FIG. 1 may be a part of the front-end 110, intermediate level 140, and back-end 150.

According to various embodiments, elastic insight to IT performance data is enabled at the front-end 110, with the ability to dynamically focus from very fine grain detail of performance data of an individual IT device or product (i.e., microscopic view 170) to the view of the whole IT product family or product solution (i.e., telescopic view 175). As described in more detail below, IT performance data is not only locally collected from the front-end 110, but also global performance data is propagated to the front-end 110. A reverse global view of an IT product, product family and/or solution is enabled from the front-end 110. Elasticity is supported in many dimensions to enable growing and shrinking the level of detail in monitoring performance data or evaluating IT entities (e.g., IT devices, products, product families, and product solutions) in an organization and/or supported/produced by the same or another organization.

Figure 2:
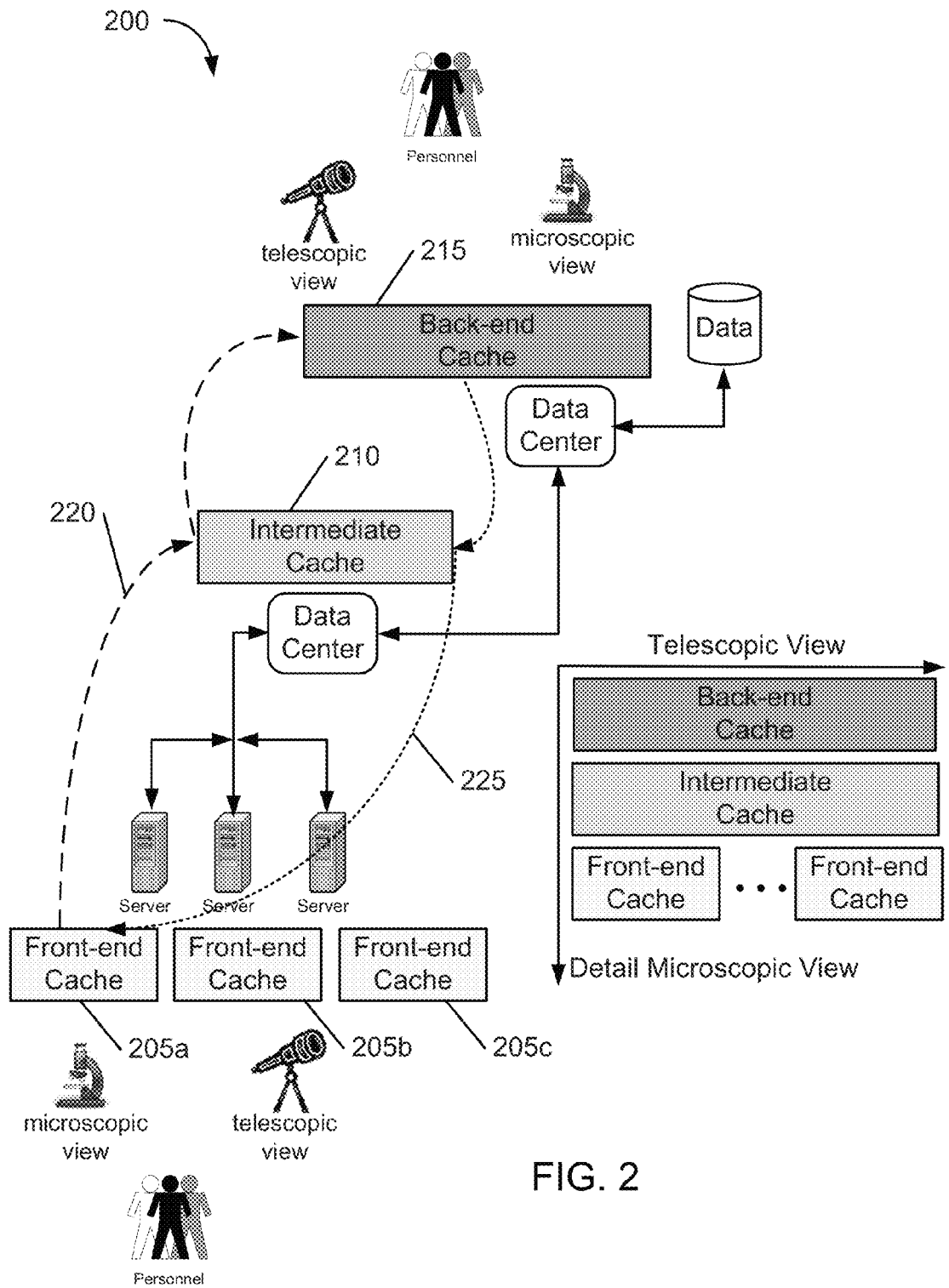
FIG. 2 is a schematic diagram illustrating how a microscopic and a telescopic view of performance data are enabled at an IT infrastructure according to various embodiments.

Attention is now directed to FIG. 2, which illustrates how a microscopic and a telescopic view of performance data are enabled at an IT infrastructure according to various embodiments. IT infrastructure 200 enables IT personnel to have a microscopic view and a telescopic view of local and global performance data by continuously pushing performance data across its levels. As illustrated, IT infrastructure 200 may store performance data at multiple IT storage devices, such as, for example, at front-end caches 205a-c, intermediate cache 210, and back-end cache 215.

Local performance data stored at the front-end caches 205a-c is continuously pushed and propagated up the IT infrastructure 200 through the intermediate cache 210 and towards the back-end cache 215, as indicated by the dashed lines 220. Similarly, global performance data stored at the back-end cache 215 is continuously pushed and propagated down the IT infrastructure 200 through the intermediate cache 210 and towards the front-end caches 205a-c, as indicated by the dotted lines 225.

As appreciated by one skilled in the art, to store local and global performance data at multiple levels of the IT infrastructure 200 may be a daunting task given the massive amounts of data that may be collected. To accomplish this, performance data is compressed as it is passed between the front-end caches 205a-c to the back-end cache 215 through the intermediate cache 210. Compressing the data enables more historical information (i.e., past performance data collected over time) to be captured at each level. In various embodiments, performance data is compressed at each level by using one or more compression algorithms, such as, for example, entropy-based compression algorithms.

Figure 3:
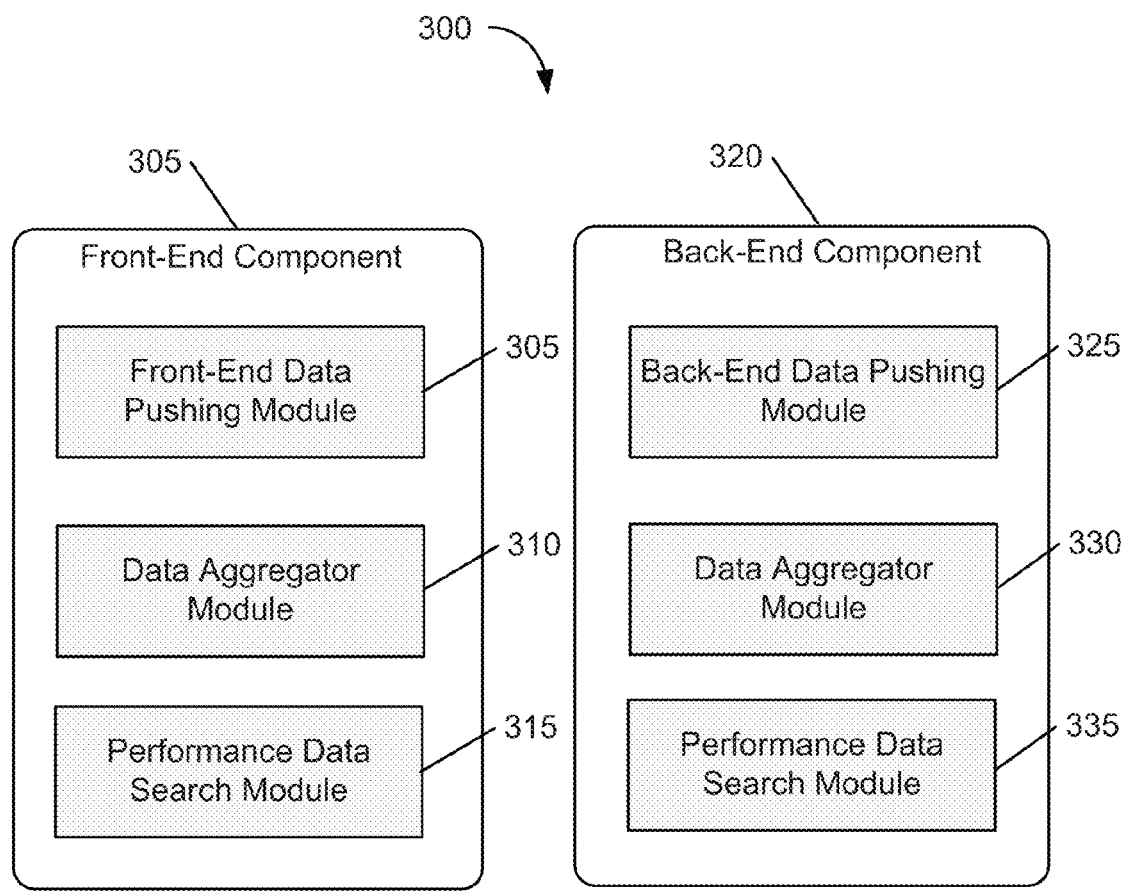
FIG. 3 is a schematic diagram of a system for providing elastic insight to IT performance data in an IT infrastructure.

A schematic diagram of a system for providing elastic insight to IT performance data in an IT infrastructure is shown in FIG. 3. System 300 may include multiple front-end and back-end components running one or more modules for providing elastic insight to IT performance data. The front-end and back-end components may include servers, storage devices, and other IT devices implementing one or more IT products, product families, and product solutions. The front-end and back-end components may also include front-end and back-end components that are dedicated to the monitoring of IT performance data.

An example front-end component 305 may include, but not be limited to, a Front-End Data Pushing Module 305, a Data Aggregator Module 310, and a Performance Data Search Module 315. The Front-End Data Pushing Module 305 may continuously push local performance data from the front-end components to the back-end components of an IT infrastructure (e.g., IT infrastructures 100 and 200). The Data Aggregator Module 310 may receive local performance data from the front-end and global performance data pushed from the back-end to the front-end. Upon receiving the performance data, the Data Aggregator Module 310 aggregates the local performance data from the front-end and the global performance data from the back-end by product, product family, and product solution. The Performance Data Search Module 315 may hierarchically search and monitor the aggregated data at each level of the IT infrastructure to identify a performance bottleneck. The hierarchical search, described in more detail below, may start at a front-end component and expand to higher-level components as needed.

Similarly, an example back-end component 320 may include, but not be limited to, a Back-End Data Pushing Module 325, a Data Aggregator Module 330, and a Performance Data Search Module 335. The Back-End Data Pushing Module 325 may continuously push global performance data from the back-end components to the front-end components of an IT infrastructure (e.g., IT infrastructures 100 and 200). The Data Aggregator Module 330 may receive global performance data from the back-end and local performance data pushed from the front-end to the back-end. Upon receiving the performance data, the Data Aggregator Module 330 aggregates the local performance data from the front-end and the global performance data from the back-end by product, product family, and product solution. The Performance Data Search Module 335 may hierarchically search and monitor the aggregated data at each level of the IT infrastructure to identify a solution to the performance bottleneck. The hierarchical search in this case may start at a back-end component and expand to lower-level components as needed.

It is appreciated that the front-end component 305 and back-end component 320 may run multiple other modules and routines. For example, compression modules for compressing data as it is pushed and aggregated in each component of the IT infrastructure, security modules to ensure that the IT infrastructure is safe from attacks, data store modules for managing data storage, anomaly detection modules, and so on. It is further appreciated that all monitoring and search tasks may be performed at the front-end if desired. Additionally, it is appreciated that due to the scale of the vast amounts of performance data stored over time for numerous IT products, product families, and product solutions, not all front-end components and back-end components of the IT infrastructure may store all of the performance data. Performance data storage may be reserved for a subset of the front-end and back-end components to guarantee that all relevant data is stored, searched, and analyzed without any degradation in performance.

Figure 4:
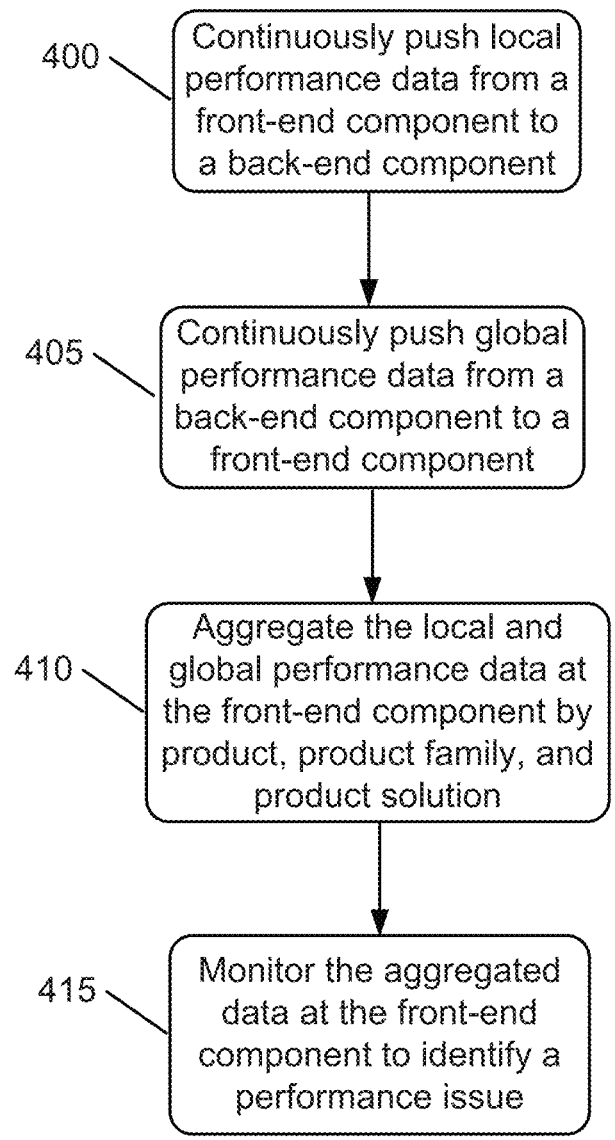
FIG. 4 is a flowchart for providing elastic insight to IT performance data according to various embodiments.

FIG. 4 is a flowchart for providing elastic insight to IT performance data according to various embodiments. As described above, elastic insight is provided by continuously pushing local performance data from a front-end component to a back-end component (400) and continuously pushing global performance data from a back-end component to a front-end component (405). The local and global performance data are aggregated at the front-end component by IT product, product family, and product solution (410). The aggregated data is monitored at the front-end component to identify a performance bottleneck (415). A hierarchical search may also be performed to identify the performance bottleneck across the IT infrastructure.

As appreciated by one skilled in the art and according to various embodiments, IT personnel may interact with one or more front-end components to detect failures and anomalies earlier in their lifetime by having access to local and global performance data aggregated by products, product families, and product solutions. As also appreciated by one skilled in the art, performance data aggregation, monitoring and search may also be performed at back-end components (e.g., by Data Aggregator Module 325, Back-End Performance Data Monitoring Module 330, and Performance Data Search Module 335 in back-end component 320).

Figure 5:
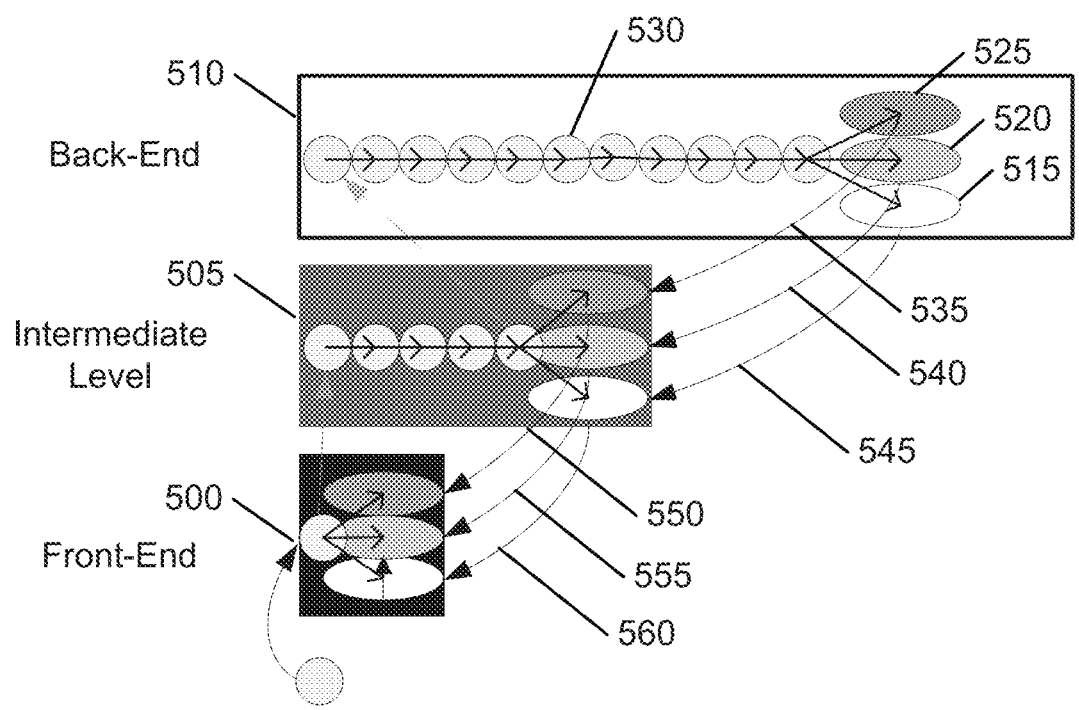
FIG. 5 is a schematic diagram illustrating how performance data is stored at multiple levels of an IT infrastructure according to various embodiments.

Attention is now directed to FIG. 5, which illustrates a schematic diagram showing how performance data is stored at multiple levels of an IT infrastructure according to various embodiments. Each front-end component 500, intermediate level component 505, and back-end component 510 that stores performance data may store multiple instances of such data. For example, the white oval 515 at back-end component 510 may represent performance data from each product that is collected and pushed up the IT infrastructure. Similarly, the light gray oval 520 at back-end component 510 may represent performance data from each product family that is collected and pushed up the IT infrastructure and the dark gray oval 525 may represent performance data from each product solution that is collected and pushed up the IT infrastructure. The circles 530 may represent increments of performance data from each product, product family, and product solution that is collected and pushed up the hierarchy over time. The data collected in white oval 515 by product, in light gray oval 520 by product family, and in dark gray oval 525 by product family may be compressed as described above to enable the storage of significantly more information than if the data had not been compressed.

Figure 6:
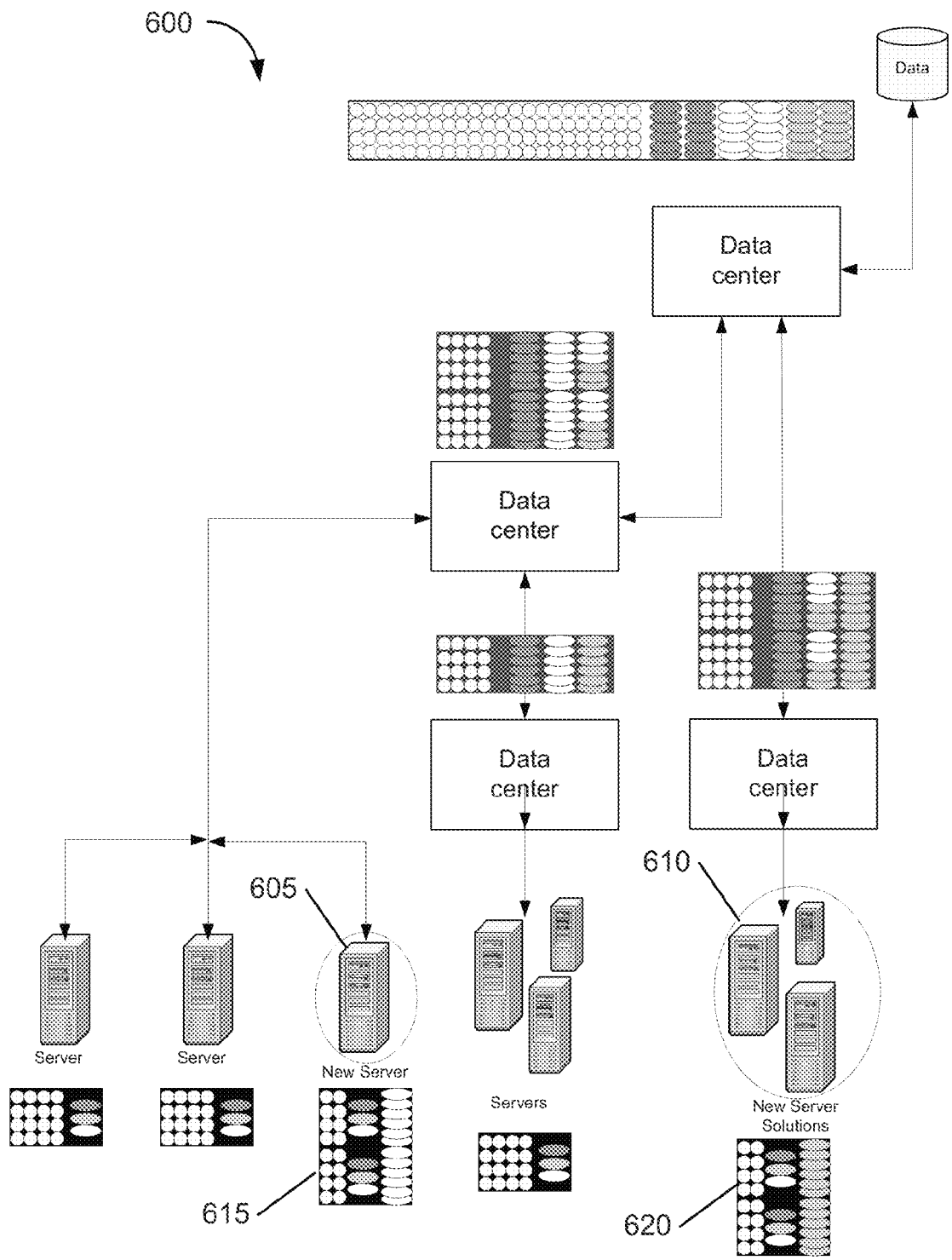
FIG. 6 is a schematic diagram illustrating a view of the performance data stored at multiple levels of an IT infrastructure.

Further, the data collected at each level of the IT infrastructure is pushed to the other levels to ensure more access to performance data across all levels. For example, as represented by arrows 535-560, the data collected at back-end component 510 and intermediate level component 505 is pushed to front-end component 500 where it is compressed, aggregated, and monitored. A view of the data stored at multiple levels of an IT infrastructure is shown in FIG. 6. IT infrastructure 600 is shown having product data, product family data, and product solution data stored at its front-end, back-end, and intermediate levels, allowing for a microscopic and telescopic view of the data. When a new IT device, product, product family, or product solution is added to the IT infrastructure 600, that device, product, product family, or product solution can have fast access to aggregated data. For example, when server 605 and new server solution 610 are added to the IT infrastructure 600, server 605 and new server solution 610 can respectively access aggregated data 615 and 620 at different scopes, sizes, times, and levels of the IT infrastructure 600.

Figure 7:
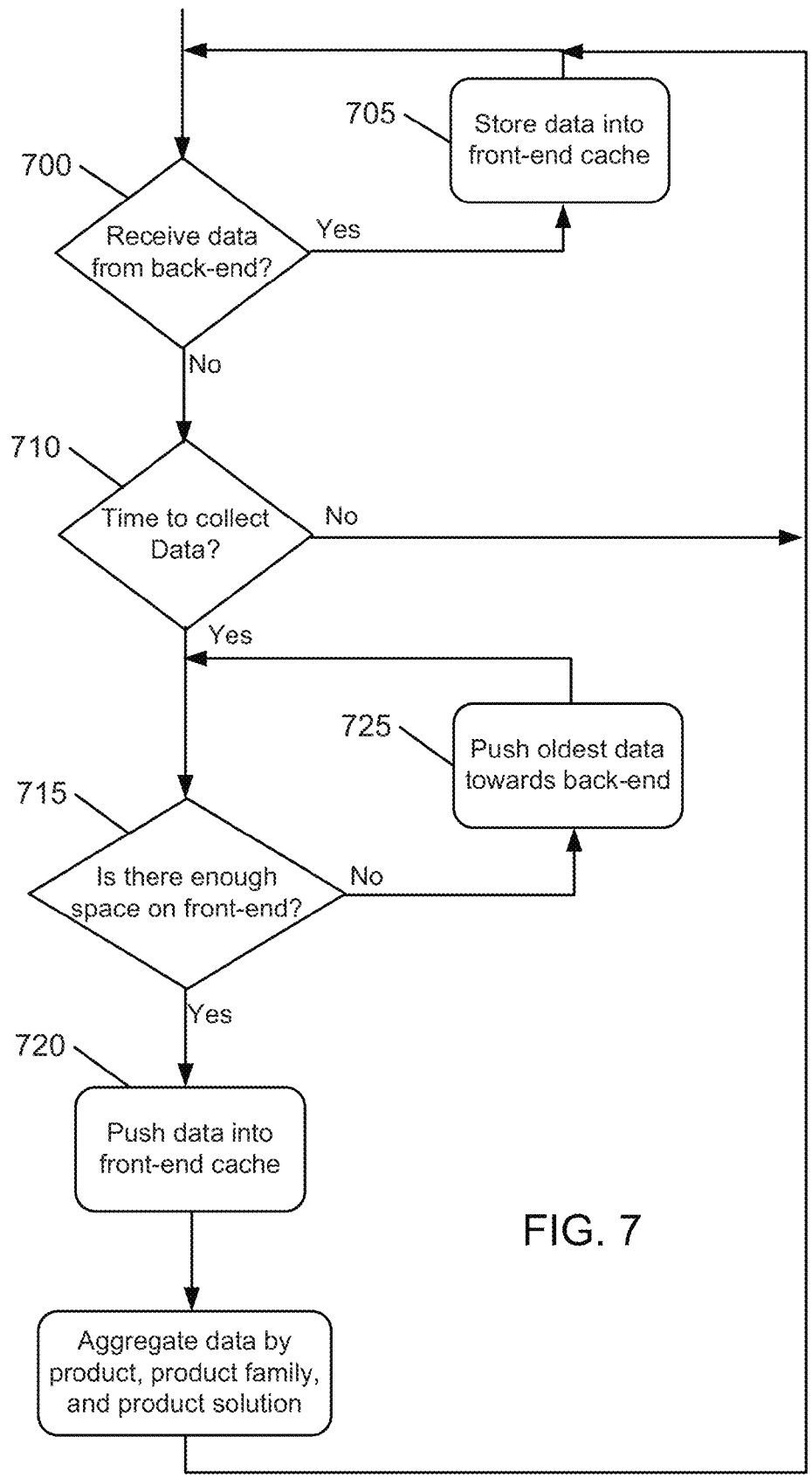
FIG. 7 is a flowchart for continuously pushing data from the front-end to the back-end of an IT infrastructure.

Referring to FIG. 7, a flowchart for continuously pushing data from the front-end to the back-end of an IT infrastructure is described. Performance data is continuously pushed from the back-end to the front-end. When the data is received at the front-end (700), it is stored in a front-end component such as a front-end cache (705). The data may be collected at given time periods. If a time period for collecting data is up (710), then a check needs to be performed to ensure that there is enough space at the front-end cache to store the data (715). If there is, then the data is pushed into the front-end cache (720) and aggregated by product, product family, and product solution. Otherwise, if there is no space at the front-end cache, then the oldest data stored at the front-end gets pushed towards the back-end where it is stored (725).

Figure 8:
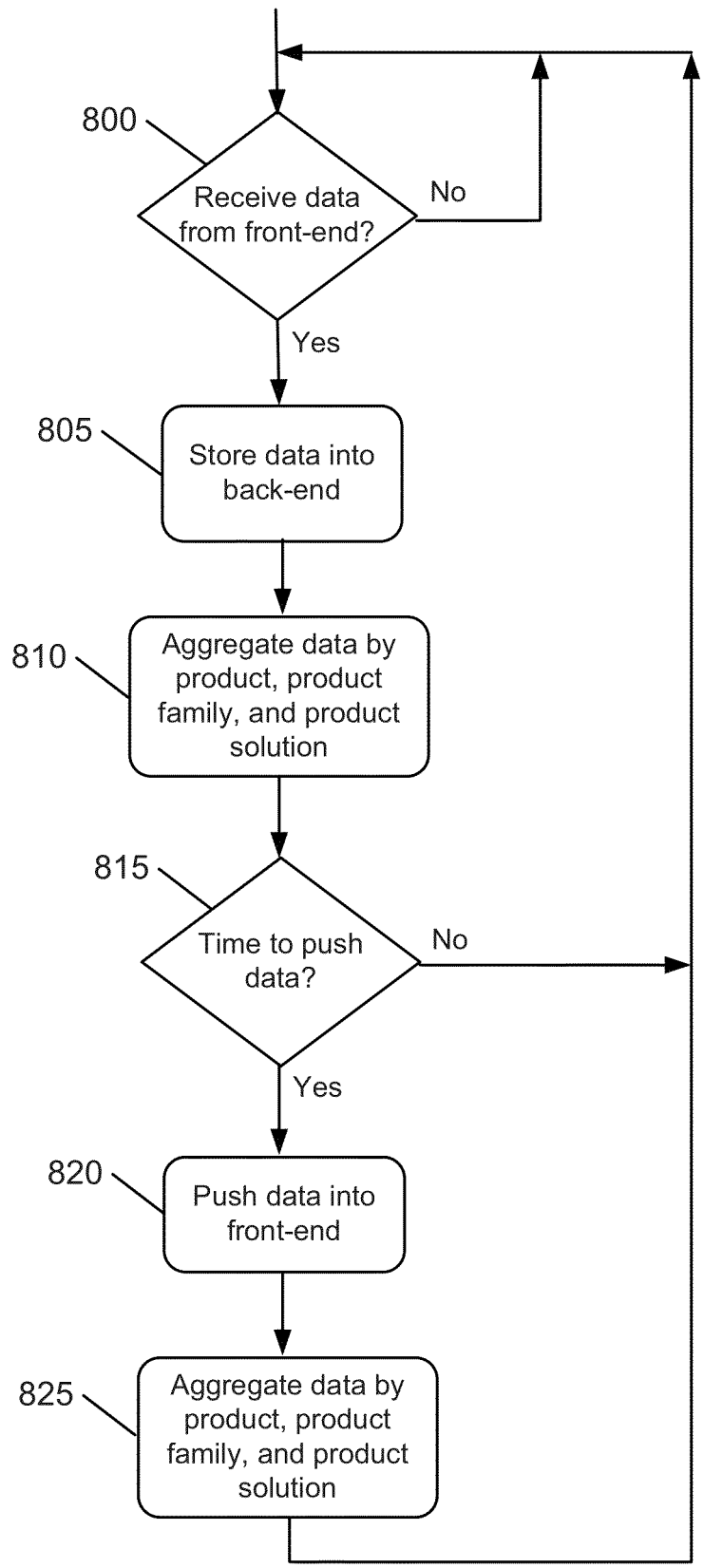
FIG. 8 is a flowchart for continuously pushing data from the back-end to the front-end of an IT infrastructure.

Similarly, referring now to FIG. 8, a flowchart for continuously pushing data from the back-end to the front-end of an IT infrastructure is described. Performance data is continuously pushed from the front-end to the back-end. When the data is received from the front-end at the back-end (800), it is stored in a back-end component such as aback-end cache (805). The data is then aggregated by product, product family, and product solution (810). In various embodiments, the data may be pushed to the front-end at given time periods. If a time period for pushing data to the front-end is up (815), then the data is pushed from the back-end to the front-end (820). At the front-end, the data is aggregated by product, product family, and product solution (825).

Figure 9:
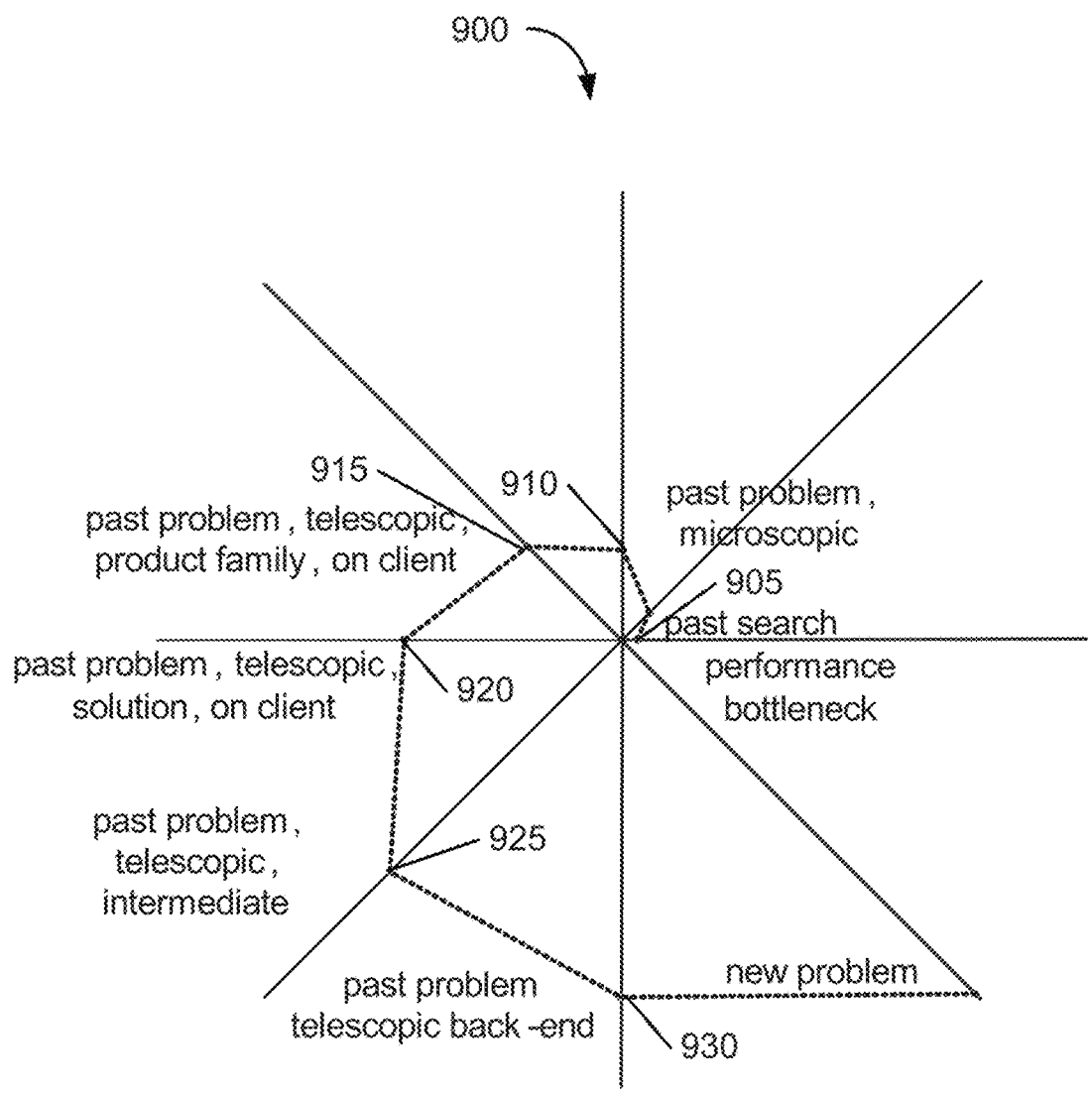
FIG. 9 is a schematic diagram illustrating a hierarchical search to identify a performance bottleneck according to various embodiments.

As described above, the aggregated data may be monitored at the front-end (and back-end) to identify a performance bottleneck. Data may also be hierarchically searched across the IT infrastructure to identify the performance bottleneck across the IT infrastructure. A schematic diagram illustrating a hierarchical search is shown in FIG. 9. The graph 900 describes how a performance bottleneck can be detected as a function of cost (e.g., time, amount of data searched, resources consumed, etc.). Search may first start by exploring if a performance bottleneck has already been identified for given symptoms. If yes, a problem has been detected. If not, the next step may be to explore past searches since in various embodiments all searches are archived together with the performance data, as well as the outcomes of the searches (905). The hierarchical search continues by exploring history at the microscopic level, at the product where there is a bottleneck (910).

The next step may be to look at past problems telescopically, i.e., by looking at the history of the product family (915) and product solutions (920). If neither search results in success, then the search is expanded on the intermediate levels of the IT infrastructure (925), and continued on to the back-end (930) if needed. If none of the searchers performed results in a positive outcome, then the performance bottleneck is declared as new. It is appreciated that data on both the performance bottleneck identified and on past searches can be stored at the front-end, back-end, or cached at any other intermediate level of the IT infrastructure. It is also appreciated that by storing all performance data, past searches, and history on past performance bottlenecks enables IT personnel to also store data reflecting solutions to past performance bottlenecks. Doing so may considerably speed up the process to identify performance bottlenecks in an IT infrastructure. It is further appreciated that the hierarchical search described above is one possible search algorithm that may be used; other search algorithms may also be implemented.

Figure 10:
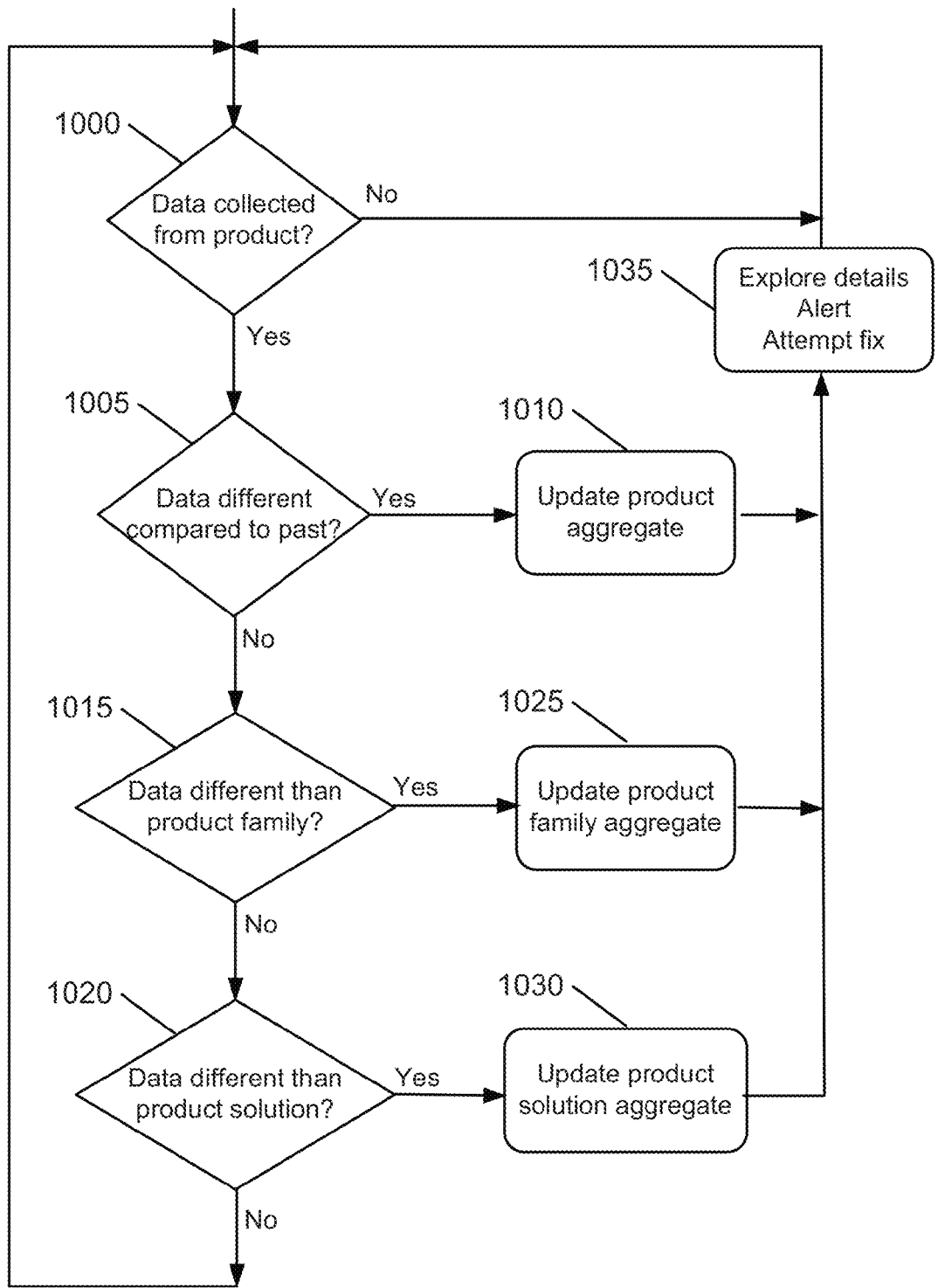
FIG. 10 is an example flowchart for identifying a performance bottleneck at the front-end.

An example flowchart for identifying a performance bottleneck at the front-end is described in FIG. 10. First, a check is performed to verify that data has been collected on the product in question of suffering a performance bottleneck (1000). If the data has been collected, then the data is compared to past performance data stored for the product (1005). If the data is different from past data, then the aggregated data for the product is updated (1010). Otherwise, the data is compared to past performance data stored for the product family (1015) and for the product solution (1020). When the data is different from the past data for the product family or for the product solution, the aggregated data is updated (1025-1030). Any time after an update of the aggregated data, the aggregated data is analyzed to identify the performance bottleneck (1035). An alert may be issued to IT personnel or the IT infrastructure itself that a bottleneck has been identified. IT personnel and other tools in the IT infrastructure may then attempt to fix the identified bottleneck.

Figure 11:
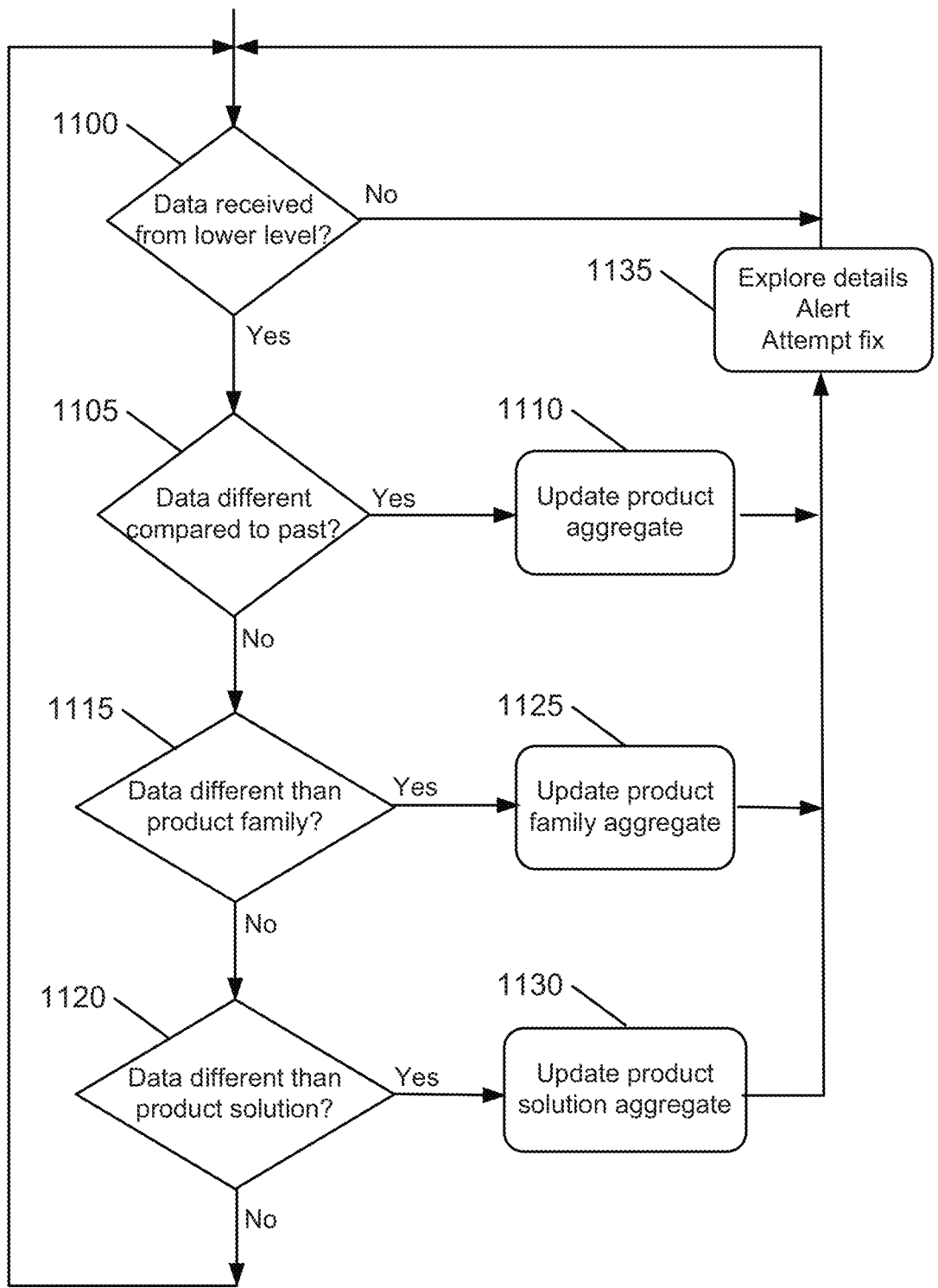
FIG. 11 is an example flowchart for identifying a performance bottleneck at the back-end.

A similar process is performed at the back-end. FIG. 11 shows an example flowchart for identifying a performance bottleneck at the back-end. First, a check is performed to verify that data has been collected on the product in question of suffering a performance bottleneck and received from a lower level in the IT infrastructure (1100). If the data has been collected, then the data is compared to past performance data stored for the product (1105). If the data is different from past data, then the aggregated data for the product is updated (1110). Otherwise, the data is compared to past performance data stored for the product family (1115) and for the product solution (1120). When the data is different from the past data for the product family or for the product solution, the aggregated data is updated (1125-1130). Any time after an update of the aggregated data, the aggregated data is analyzed to identify the performance bottleneck (1135). An alert may be issued to IT personnel or the IT infrastructure itself that a bottleneck has been identified. IT personnel and other tools in the IT infrastructure may then attempt to fix the identified bottleneck.

Figure 12:
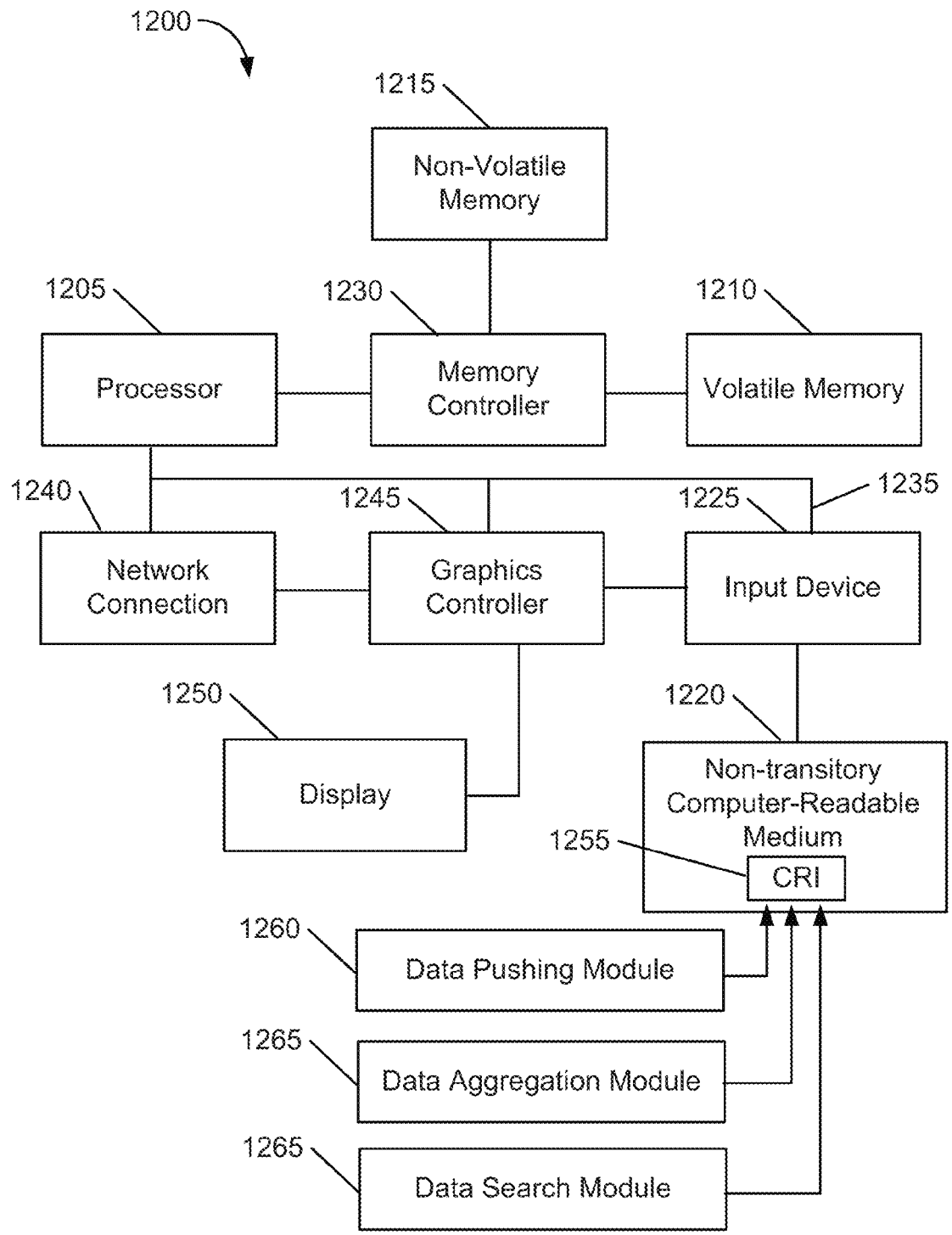
FIG. 12 is a block diagram of an example IT component of FIG. 3 according to the present disclosure.

As described above with reference to FIG. 3, the data pushing, aggregation, and searching modules for performing the steps of FIG. 4 and FIGS. 7-11 can be implemented in a combination of hardware and computer software. Referring now to FIG. 12, an IT component of FIG. 3 according to the present disclosure is described. The IT component 1200 (e.g., a front-end component or a back-end component) can include a processor 1205 and memory resources, such as, for example, the volatile memory 1210 and/or the non-volatile memory 1215, for executing instructions stored in a tangible non-transitory medium (e.g., volatile memory 1210, non-volatile memory 1215, and/or computer readable medium 1220) and/or an application specific integrated circuit ("ASIC") including logic configured to perform various examples of the present disclosure.

A machine (e.g., a computing device) can include and/or receive a tangible non-transitory computer-readable medium 1220 storing a set of computer-readable instructions (e.g., software) via an input device 1225. As used herein, the processor 1205 can include one or a plurality of processors such as in a parallel processing system. The memory can include memory addressable by the processor 1205 for execution of computer readable instructions. The computer readable medium 1220 can include volatile and/or non-volatile memory such as a random access memory ("RAM"), magnetic memory such as a hard disk, floppy disk, and/or tape memory, a solid state drive ("SSD"), flash memory, phase change memory, and so on. In some embodiments, the non-volatile memory 1215 can be a local or remote database including a plurality of physical non-volatile memory devices.

The processor 1205 can control the overall operation of the IT component 1200. The processor 1205 can be connected to a memory controller 1230, which can read and/or write data from and/or to volatile memory 1210 (e.g., RAM). The memory controller 1230 can include an ASIC and/or a processor with its own memory resources (e.g., volatile and/or non-volatile memory). The volatile memory 1210 can include one or a plurality of memory modules (e.g., chips). The processor 1205 can be connected to a bus 1235 to provide communication between the processor 1205, the network connection 1240, and other portions of the IT component 1200. The non-volatile memory 1215 can provide persistent data storage for the IT component 1200. Further, the graphics controller 1245 can connect to an optional display 1250.

Each IT component 1200 can include a computing device including control circuitry such as a processor, a state machine, ASIC, controller, and/or similar machine. As used herein, the indefinite articles "a" and/or "an" can indicate one or more than one of the named object. Thus, for example, "a processor" can include one or more than one processor, such as in a parallel processing arrangement.

The control circuitry can have a structure that provides a given functionality, and/or execute computer-readable instructions that are stored on a non-transitory computer-readable medium (e.g., the non-transitory computer-readable medium 1220). The non-transitory computer-readable medium 1220 can be integral, or communicatively coupled, to a computing device, in either a wired or wireless manner. For example, the non-transitory computer-readable medium 1220 can be an internal memory, a portable memory, a portable disk, or a memory located internal to another computing resource (e.g., enabling the computer-readable instructions to be downloaded over the Internet).

The non-transitory computer-readable medium 1220 can have computer-readable instructions 1255 stored thereon that are executed by the processor 1205 to implement a data pushing module 1260, a data aggregator module 1265, and a data search module 1270 according to the present disclosure. The non-transitory computer-readable medium 1220, as used herein, can include volatile and/or non-volatile memory. Volatile memory can include memory that depends upon power to store information, such as various types of dynamic random access memory ("DRAM"), among others. Non-volatile memory can include memory that does not depend upon power to store information. Examples of non-volatile memory can include solid state media such as flash memory, EEPROM, and phase change random access memory ("PCRAM"), among others. The non-transitory computer-readable medium 1220 can include optical discs, digital video discs ("DVD"), Blu-Ray Discs, compact discs ("CD"), laser discs, and magnetic media such as tape drives, floppy discs, and hard drives, solid state media such as flash memory, EEPROM, PCRAM, as well as any other type of computer-readable media.

Advantageously, storing aggregated data by product, product family, and product solution at all levels of an IT infrastructure enables performance data monitoring to be promptly initiated from the front-end (and back-end), while providing opportunities for integration with other IT management tools at the front-end as well as location and solution awareness. Performance data is not only locally collected from the front-end, but also global performance data is propagated to the front-end. A reverse global view of a product, product family, and product solutions is enabled directly at the front-end.

Further, elasticity is supported in many dimensions, thereby enabling the growing and shrinking of the level of detail in monitoring or evaluating IT entities in a business organization and/or supported/produced by another organization. The hierarchical search that is performed on the aggregated data enables IT personnel to know when to look at performance data microscopically or telescopically based on the type of performance bottleneck. For example, to identify soft memory errors in an IT device, the hierarchical search may look at detailed error logs at geographical locations of similar IT devices to see if they are related to altitude or cosmic ray impact.

By providing telescopic data to IT devices at multiple levels of an IT infrastructure, local diagnostics, monitoring, and security tools can take into account learning from a macro dimensional analysis. The immediate benefit can be faster and real-time resolution of problems and more intelligent resource management or tuning. Customers that experience issues can start to expect a more immediate and diverse set of solutions from local analysis that has telescopic data. For example, if a local datacenter has stocked part replacements it may be unnecessary to have any interaction with the supplier if the supplier preloads telescopic rules for replacements at the device or datacenter level. Full automation may be achieved with on-device redundancy. If problems are occurring in multiple geographies, altitudes, configurations, power or thermal environments, etc., detection rules can be sent to IT devices worldwide in real time. This is especially useful in a large scale datacenter or the cloud where environments are often diverse and dispersed.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. For example, it is appreciated that the present disclosure is not limited to a particular configuration, such as IT component 1200.

Those of skill in the art would further appreciate that the various illustrative modules and steps described in connection with the embodiments disclosed herein may be implemented as a combination of electronic hardware and computer software. For example, the example steps of FIG. 4 and FIGS. 7-11 may be implemented using software modules, hardware modules or components, or a combination of software and hardware modules or components. Thus, in one embodiment, one or more of the example steps of FIG. 4 and FIGS. 7-11 may comprise hardware modules or components. In another embodiment, one or more of the steps of FIG. 4 and FIGS. 7-11 may comprise software code stored on a computer readable storage medium, which is executable by a processor.

To clearly illustrate this interchangeability of hardware and software, various illustrative components, blocks, modules, and steps have been described above generally in terms of their functionality (e.g., the data pushing module 1260, the data aggregator module 1265, and the data search module 1270). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A method for providing elastic insight to information technology ("IT") performance data in an IT infrastructure, the method comprising:
    continuously pushing local performance data from a front-end component to a back-end component via an intermediate cache;
    continuously pushing global performance data from the back-end component to the front-end component via the intermediate cache;
    aggregating the local performance data and the global performance data at the front-end component into aggregated data by product, product family, and product solution;
    monitoring the aggregated data at the front-end component to identify a performance bottleneck; and
    updating the aggregated data in response to a detected difference in the aggregated data as compared to past performance data stored for the product, the product family, and the product solution.

2. The method of claim 1, further comprising compressing the local performance data and the global performance at the front-end component.

3. The method of claim 1, further comprising compressing the local performance data and the global performance data at the back-end component.

4. The method of claim 1, wherein continuously pushing local performance from a font-end component to a back-end component comprises compressing the local performance data as it is pushed through intermediate levels of the IT infrastructure between the front-end component and the back-end component.

5. The method of claim 1, wherein continuously pushing global performance from a back-end component to a front-end component comprises compressing the global performance data as it is pushed through intermediate levels of the IT infrastructure between the front-end component and the back-end component.

6. The method of claim 1, further comprising storing the local performance data and the global performance data at the front-end component.

7. The method of claim 1, further comprising storing the local performance data and the global performance data at the back-end component.

8. The method of claim 1, further comprising hierarchically searching the aggregated data from the front-end component to the back-end component.

9. The method of claim 1, further comprising comparing the local performance data and the global performance data to past data to identify a performance bottleneck.

10. The method of claim 9, further comprising updating the aggregated data if the continuously pushed local performance data is different from past data.

11. The method of claim 9, further comprising updating the aggregated data if the continuously pushed global performance data is different from past data.

12. A system for providing elastic insight to information technology performance data, the system comprising:
   a front-end data pushing module to continuously push, via a processor, local performance data from a front-end component to a back-end component via an intermediate cache;
   a back-end data pushing module to continuously push, via the processor, global performance data from a back-end component to a front-end component via the intermediate cache;
   a data aggregator module to aggregate, via the processor, the local performance data and the global performance data into aggregated data by product, product family, and product solution;
   a performance data search module to hierarchically search, via the processor, the aggregated data to identify a performance bottleneck, the hierarchical search starting at a front-end component and expanding to higher-level components as needed; and
   a performance data search module to update, via the processor, the aggregated data in response to a detected difference in the aggregated data as compared to past performance data stored for the product, the product family, and the product solution.

13. The system of claim 12, wherein the front-end data pushing module is configured to push data, via the processor, to the back-end at given time periods.

14. The system of claim 12, wherein the back-end data pushing module is configured to push data, via the processor, to the front-end at given time periods.

15. The system of claim 12, wherein the front-end data pushing module is configured to check, via the processor, for storage space in the front-end component before storing the global performance data at the front-end component.

16. The system of claim 15, wherein the front-end data pushing module is configured to push past data, via the processor, to the back-end component if there is no storage space in the front-end component.

17. A non-transitory computer readable medium having instructions stored thereon executable by a processor to:
   push local performance data from a front-end component to a back-end component via an intermediate cache;
   push global performance data from the back-end component to the front-end component via the intermediate cache;
   aggregate the local performance data and the global performance data into aggregated data by product, product family, and product solution;
   compare product data to product family data and product solution data to identify a performance bottleneck; and
   update the aggregated data in response to a detected difference in the aggregated data as compared to past performance data stored for the product, the product family, and the product solution.

18. The non-transitory computer readable medium of claim 17, further comprising instructions to hierarchically search the local performance data and the global performance from the front-end component to the back-end component.

19. The non-transitory computer readable medium of claim 17, further comprising instructions to store past data in the front-end component and in the back-end component.

20. The non-transitory computer readable medium of claim 18, wherein the instructions to compare product data to product family data and product solution data comprises instructions to compare current product data, product family data, and product solution data to past data.

* * * * *